(12) United States Patent
Daiss et al.

(10) Patent No.: US 6,373,148 B1
(45) Date of Patent: Apr. 16, 2002

(54) METHOD AND APPARATUS FOR PLACING A DRIVING MOTOR OF A MOTOR VEHICLE INTO OPERATION

(75) Inventors: Armin Daiss, Wenzenbach; Johannes Ilg, Regensburg, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/410,923

(22) Filed: Oct. 1, 1999

(30) Foreign Application Priority Data

Oct. 1, 1998 (DE) .......................................... 198 45 299

(51) Int. Cl.[7] .............................................. H01H 47/00
(52) U.S. Cl. ...................... 307/10.5; 307/9.1; 307/10.1; 307/10.2; 307/10.6; 701/35
(58) Field of Search ................................ 307/9.1, 10.1, 307/10.2, 10.5, 10.6; 701/35; 340/426

(56) References Cited

U.S. PATENT DOCUMENTS 5,867,802 A * 2/1999 Borza ........................... 701/35

FOREIGN PATENT DOCUMENTS

DE 19522940 A1 1/1997

* cited by examiner

Primary Examiner—Josie Ballato
Assistant Examiner—Robert L DeBeradinis
(74) Attorney, Agent, or Firm—Herbert L. Lerner; Laurence A. Greenberg; Werner H. Stemer

(57) ABSTRACT

A motor vehicle is provided with a usage authorization checking device that detects biometric data of a person with a biometric sensor configuration. If the usage authorization check, performed with biometrically detected data, is positive, the vehicle can be put into operation by performing a predetermined actuation without actuating a separate ignition or starter switch. A separate ignition or starter switch is eliminated. The driving motor can be an electric motor or an internal combustion engine. The predetermined actuation can include movement of an accelerator pedal, a transmission shift lever, a clutch pedal and a brake pedal. The biometric sensor configuration can also include connections to a driving motor start-up device and a shut-off device.

14 Claims, 1 Drawing Sheet

METHOD AND APPARATUS FOR PLACING A DRIVING MOTOR OF A MOTOR VEHICLE INTO OPERATION

BACKGROUND OF THE INVENTION

FIELD OF THE INVENTION

The invention lies in the field of motor vehicles. The invention relates to a method and an apparatus for placing a driving motor of a motor vehicle into operation.

In order to prevent unauthorized starting of a motor vehicle, the prior art discloses detecting biometric characteristics of an authorized person with a sensor, converting the detected data into calculation data by a predetermined algorithm and storing the calculation data in a memory in the vehicle. When a person wants to put the motor vehicle into operation, a biometric sensor configuration mounted on the vehicle detects the biometric characteristics of the person, the predetermined algorithm converts the biometric characteristics into data, and the biometric characteristics are compared with calculation data stored in memory. If the compared data at least largely match, a calculation signal is generated, in response to which an ignition and starting switch of the motor vehicle can be actuated, for example, with the aid of a conventional mechanical key. Alternatively, starting of the vehicle can take place immediately by a starter button provided on the dashboard.

German Published, Non-Prosecuted Patent Application 195 22 940 A1 defines the generic type of device in question and discloses a method and an apparatus for putting a motor vehicle into operation in which voice recognition is used for the authorization of a person to use the vehicle. If the checking device determines that a speech characteristic vector of the person to be checked agrees with a characteristic vector stored in memory, then the system opens a vehicle door, and/or enables the on-board electrical system, and/or closes the current circuit between the battery and the ignition so that starting is made possible. Alternatively, the system can directly start the vehicle so that no key is needed to actuate an ignition and starting lock. The engine also can be turned off using an optional scanner.

Direct starting, by speaking a predetermined word or identifying a voice, has particular disadvantageous features. If loud extraneous noise is present, there is a risk that secure, instantaneous identification will not be accomplished, resulting in starting delay. Such delay can lead to a decrease in security for the user and to dangerous situations. Also, if only one word (i.e., "start") is required for input and does not require an authorization check, there is a risk that the engine will be started by someone other than the authorized driver (s). Authorization check based upon a single input word can lead to delays and is relatively complex.

SUMMARY OF THE INVENTION

It is accordingly an object of the invention to provide a method and an apparatus for placing a driving motor of a motor vehicle into operation that overcomes the hereinafore-mentioned disadvantages of the heretofore-known devices and methods of this general type and that places a motor vehicle into operation in a convenient and safe way and that has a simple configuration.

With the foregoing and other objects in view, there is provided, in accordance with the invention, a method for placing a motor vehicle driving motor into operation by an authorized user, including the steps of: detecting biometric characteristics of a user; checking whether the user is an authorized operator by comparing data derived from the detection of the user's biometric characteristics with data stored in memory; placing the motor vehicle driving motor into a condition for operation by performing at least one predetermined actuation if the usage authorization check is positive without the user having to actuate a separate, portable control element for an ignition or starter switch; and actuating at least one actuating element necessary for driving the vehicle in a predetermined way to place the driving motor into operation.

In accordance with another mode of the invention, the driving motor is an internal combustion engine and the step of actuating at least one actuating element necessary for driving the vehicle in a predetermined way starts the engine.

In accordance with a further mode of the invention, the step of actuating at least one actuating element necessary for driving the vehicle in a predetermined way is an actuation of an accelerator pedal.

In accordance with an added mode of the invention, the step of actuating at least one actuating element necessary for driving the vehicle in a predetermined way is an actuation of a shift lever for shifting a transmission.

In accordance with an additional mode of the invention, the step of actuating at least one actuating element necessary for driving the vehicle in a predetermined way is an actuation of an accelerator pedal and an actuation of a clutch pedal.

In accordance with yet another mode of the invention, the step of actuating at least one actuating element necessary for driving the vehicle in a predetermined way is an actuation of a shift lever for shifting a transmission and an actuation of a clutch pedal.

In accordance with yet a further mode of the invention, the transmission is an automatic transmission and the step of actuating at least one actuating element necessary for driving the vehicle in a predetermined way is an actuation of a brake pedal and a movement of the shift lever into a driving stage.

In accordance with yet an added mode of the invention, the transmission is a manual transmission and the step of actuating at least one actuating element necessary for driving the vehicle in a predetermined way is an actuation of a clutch pedal and a movement of the shift lever into a driving gear.

With the objects of the invention in view, there is also provided an apparatus for placing a motor vehicle driving motor into operation, including: a biometric sensor configuration for detecting biometric data of a person and deriving calculation data by a predetermined algorithm; a control unit having a memory device for storing authorization data and the calculation data, and a comparator for comparing the authorization data with the calculation data and generating a calculation signal if the authorization data and the calculation data are substantially similar; and at least one sensor connected to the control unit for detecting an actuation of at least one actuating element of the motor vehicle required for driving the motor vehicle, the control unit being formed to place the motor vehicle driving motor into operation upon actuation of the at least one actuating element in a predetermined way.

In accordance with another feature of the invention, the control unit is formed to place the motor vehicle internal combustion engine into operation upon actuation of the at least one actuating element in a predetermined way.

With the objects of the invention in view, there is also provided an apparatus for placing a motor vehicle driving motor into operation, including: a biometric sensor configuration for detecting biometric data of a person and deriving calculation data by a predetermined algorithm, the biometric sensor configuration having a biometric sensor region for detecting a fingerprint pattern and at least two spacing sensor regions adjacent the biometric sensor region; and a control unit having a memory device for storing authorization data and the calculation data, and a comparator for comparing the authorization data with the calculation data and generating a calculation signal if the authorization data and the calculation data are substantially similar.

In accordance with another feature of the invention, a first of the at least two spacer sensor regions is connected to a start-up device of the driving motor and a second of the at least two spacing sensor regions is connected to a shut-off device of the driving motor.

In accordance with a further feature of the invention, at least two spacing sensor regions are disposed on opposite sides of the biometric sensor region.

In accordance with a concomitant feature of the invention, the two spacing sensor regions are disposed adjacent the biometric sensor region at a bottom of a channel.

In the method of the invention, in order to put the engine into operation, a person checked for his authorization for use on the basis of biometric characteristics need actuate only one or more actuating elements already needed for driving the vehicle, such as a steering wheel, shift lever, accelerator pedal, clutch pedal, or brake pedal in a predetermined way. If the vehicle has an electric motor, then placing it into operation includes activating the current circuits for the electric motor and for the vehicle electronics. If the vehicle includes an internal combustion engine, then placing it into operation includes, in particular, starting the engine.

Other features that are considered as characteristic for the invention are set forth in the appended claims.

Although the invention is illustrated and described herein as embodied in a method and an apparatus for putting a driving motor of a motor vehicle into operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2b is a diagrammatic side view of the embodiment of FIG. 2a.

DESCRIPTION OF THE PREFERRED EMBODIMENTS

Figure 1:
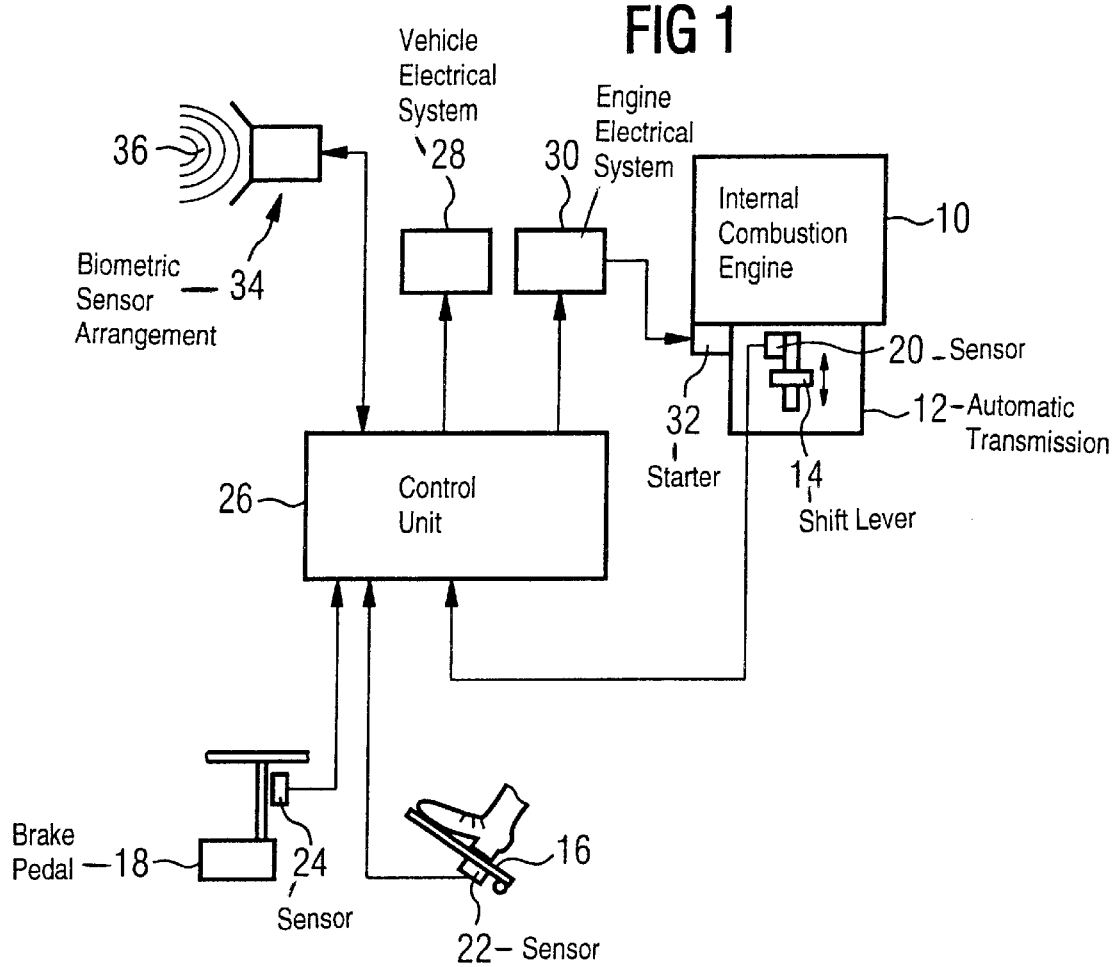
FIG. 1 is a block circuit diagram of an apparatus according to the invention.

Referring now to the figures of the drawings in detail and first, particularly to FIG. 1 thereof, there is diagrammatically shown an internal combustion engine 10 that drives non-illustrated wheels through an automatic transmission 12. The internal combustion engine 10 and the transmission 12 together represent the motor vehicle.

Various pedals are used for operating the motor vehicle, including a selector or shift lever 14 of the transmission 12, an accelerator pedal 16 and a brake pedal 18. Sensors 20, 22 and 24 connected to a control unit 26 detect the positions of the shift lever 14, the accelerator pedal 16 and the brake pedal 18.

The control unit 26, which in a conventional manner includes a micoprocessor, a program memory and a data memory, is connected to a vehicle electrical system 28 and an engine electrical system 30. The engine electrical system 30 is connected to a starter 32 of the internal combustion engine 10 and, in a conventional manner, controls the entire operation of the internal combustion engine 10 and, optionally of the transmission 12, through peripherals.

Also connected to the control unit 26 is a conventional biometric sensor configuration 34. The sensor of the biometric sensor configuration 34 is, for example, accessible on the motor vehicle dashboard and detects the fingerprint pattern 36 of a thumb.

A description of the apparatus function follows:

Using a predetermined algorithm, authorization data is generated by scanning the fingerprint pattern 36 of a person's thumb. The authorization data is written into a data memory of the control unit 26 by an authorized entity, for example, by a dealer upon purchase of the vehicle. The process can be performed directly with a biometric sensor configuration 34 permanently connected to the vehicle. The process also can be performed only by authorized persons who have access to the control unit 26, access of the control unit 26 being restricted by special security algorithms. Storing the calculation data can also be performed at authorized repair facilities by biometric sensor configurations located at the repair facilities.

When a person desires to put the motor vehicle into operation, the person places a thumb before the sensor of the biometric sensor configuration 34 located, for example, on the dashboard. The biometric sensor configuration 34 reads the fingerprint pattern 36. Applying a predetermined algorithm, and based upon predetermined biometric data, data is generated. The data is compared in the control unit 26 or in the biometric sensor configuration 34 with calculation data stored in memory. If the compared data agree completely or at least largely, the person is recognized as authorized. Then, the control unit 26 automatically puts the vehicle electrical system 28 and the engine electrical system 30 into operation, so that the vehicle is ready to be operated.

In response to a subsequent sequence of events, the control unit 26 sends a signal to the engine electrical system 30, which activates the starter 32 and the engine 10 starts. For example, the sequence of events is completed when the driver shifts the selector lever 14 out of the standard position of the shift lever 14 when the vehicle is parked (i.e., the park or neutral position) into a driving position (i.e., the reverse ("R") or drive ("D") positions) and simultaneously depresses the brake pedal 18 and the accelerator pedal 16—actions indicating that the driver expresses a wish to drive away.

The example sequence of events makes it extraordinarily comfortable for driving the vehicle away from the parked position, and renders unnecessary and superfluous actuation using an ignition key, an ignition switch, or any separate starter switch.

The apparatus described can be modified in various ways.

For example, the sensors 20, 22 and 24 can be replaced by a sensor located in the vehicle interior that senses, in response to an acoustical signal, a predetermined movement, or any predefined user action, and activates the starter 32 after positive usage checking (i.e., authentication).

The above-described sequence of events, or logical condition, of moving the shift lever 14 into a driving position and actuating the brake pedal 18 and the accelerator pedal 16 can be replaced by other logical conditions, such as (1) actuating only the accelerator pedal 16, (2) actuating only the shift lever 14 and at the same time as actuating the brake pedal 18, or (3) actuating the accelerator pedal 16 and simultaneously actuating the brake pedal 18.

If the transmission 12 is a manual transmission and the vehicle is additionally equipped with a clutch pedal, then the actuation of the starter 32 can be coupled with the condition of the clutch pedal. For example, the starter 32 can be activated when the accelerator pedal 16 is actuated while the driving gear has been selected.

Where the motor vehicle is powered by an electric motor, intrinsically, the starter 32 is omitted. The electric motor power is controlled directly with the accelerator pedal 16 through the engine electrical system 30. The electric motor can be placed into operation together with the vehicle electrical system 28 after a positive authentication.

The system can be configured to remain inactive if the vehicle is not driven away or if at least one instrument (i.e., a radio) operated by the vehicle electrical system 28 is not put into operation within a predetermined time after a positive biometric data check.

The biometric sensor configuration can be provided with two sensors, one sensor configuration being accessible from outside the vehicle and another accessible in the vehicle, for example, on the dashboard. In such a configuration, entry of the vehicle, authorized by the external sensor, is insufficient to allow the vehicle to be driven away. Rather, the system is preferably placed into a condition to operate the radio, the interior lights and other internal electrical devices by activating the engine electrical system after an authorized entry into the vehicle. At this stage, the vehicle cannot be driven away until authentication by the biometric sensor, mounted in the vehicle interior or on the dashboard, is complete.

Various biometric sensor configurations can be used. For example, those operating capacitatively, optically, electrically, magnetically, or with ultrasound. A person's biometric characteristics need not be taken from only the thumb or a finger; they can also be taken from the eyes or other person-specific features.

The invention according to FIG. 1 requires no additional switch or sensor for starting the vehicle because these sensors 20, 22 and 24 are already present in modern vehicles.

A separate ignition and starter switch may be provided in addition to the standard ignition and starter, so that the vehicle can be operated—with sacrifices in terms of convenience of operation—by other persons, such as in a repair facility.

Figure 2A:
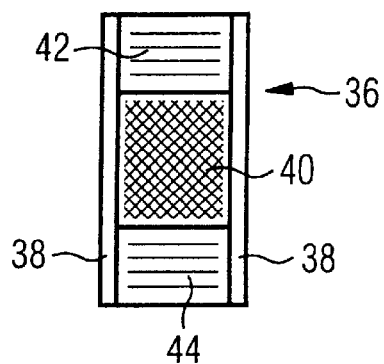
FIG. 2a is a diagrammatic plan view of an embodiment of the sensing region of a sensor configuration.
Figure 2B:
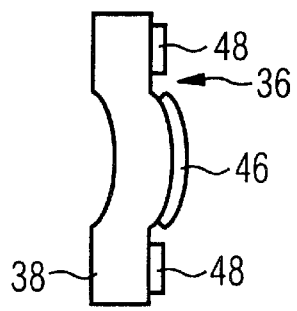

FIGS. 2a and 2b show a modified embodiment of the sensor device 34 for turning the vehicle on and off. In FIGS. 2a and 2b, a sensor region 36 is a channel with two side walls 38. Between the two side walls 38 is a biometric sensor region 40. Above and below the biometric sensor region 40 are spacing sensor regions 42 and 44. The biometric sensor region 40 is indented in step-like fashion or, as shown, in curved fashion. Located below the biometric sensor region 40 is the biometric sensor system 46 for detecting biometric data, for instance from a thumb placed on the sensor region 36. Below each of the spacing sensor regions 42 and 44, there is a spacing sensor system 48 that operates, for example, by ultrasound or capacitatively.

The function of the sensor is three-fold. Authentication is performed when a thumb is placed on the biometric sensor region 40. If the thumb is slid upward within the channel, the spacing sensor region 42 detects the upward slide and the starter 32 is activated by the engine electrical system 30 once a suitable command has been sent to the engine electrical system 30 by the control unit 26. If the thumb is slid downward along the sensor, the spacing sensor region 44 detects the downward slide and, for example, the motor is turned off.

We claim:

1. A method for placing a motor vehicle driving motor into operation by an authorized user, which comprises:

detecting biometric characteristics of a user;

checking if the user is an authorized operator by comparing data derived from the detection of the user's biometric characteristics with data stored in memory;

disengaging the motor vehicle driving motor immobilizer if the usage authorization check is positive without the user having to actuate a separate, portable control element for an ignition or starter switch; and actuating at least one actuating element necessary for driving the vehicle in a predetermined way to place the driving motor into operation.

2. The method according to claim 1, wherein the driving motor is an internal combustion engine and the step of actuating at least one actuating element necessary for driving the vehicle in a predetermined way starts the engine.

3. The method according to claim 2, wherein the step of actuating at least one actuating element necessary for driving the vehicle in a predetermined way is an actuation of an accelerator pedal.

4. The method according to claim 2, wherein the step of actuating at least one actuating element necessary for driving the vehicle in a predetermined way is an actuation of a shift lever for shifting a transmission.

5. The method according to claim 4, wherein the transmission is an automatic transmission and the step of actuating at least one actuating element necessary for driving the vehicle in a predetermined way is an actuation of a brake pedal and a movement of the shift lever into a driving stage.

6. The method according to claim 4, wherein the transmission is a manual transmission and the step of actuating at least one actuating element necessary for driving the vehicle in a predetermined way is an actuation of a clutch pedal and a movement of the shift lever into a driving gear.

7. The method according to claim 2, wherein the step of actuating at least one actuating element necessary for driving the vehicle in a predetermined way is an actuation of an accelerator pedal and an actuation of a clutch pedal.

8. The method according to claim 2, wherein the step of actuating at least one actuating element necessary for driving the vehicle in a predetermined way is an actuation of a shift lever for shifting a transmission and an actuation of a clutch pedal.

9. An apparatus for placing a motor vehicle driving motor into operation, comprising:

a biometric sensor configuration for detecting biometric data of a person and deriving calculation data by a predetermined algorithm;

a control unit having a memory device for storing authorization data and the calculation data, and a comparator for comparing the authorization data with the calculation data and generating a calculation signal if the authorization data and the calculation data are substantially similar; and at least one sensor connected to said control unit for detecting an actuation of at least one actuating element of the motor vehicle required for driving the motor vehicle, said control unit placing the motor vehicle driving motor into operation upon actuation of the at least one actuating element in a predetermined way.

10. The apparatus according to claim 9, wherein said control unit places the motor vehicle internal combustion engine into operation upon actuation of the at least one actuating element in a predetermined way.

11. An apparatus for placing a motor vehicle driving motor into operation, comprising:
   a biometric sensor configuration for detecting biometric data of a person and deriving calculation data by a predetermined algorithm, said biometric sensor configuration having a biometric sensor region for detecting a fingerprint pattern and at least two spacing sensor regions adjacent said biometric sensor region; and
   a control unit having:
      a memory device for storing authorization data and the calculation data;
      a comparator for comparing the authorization data with the calculation data and generating a calculation signal if the authorization data and the calculation data are substantially similar; and
      an immobilization disengagement device releasing a vehicle immobilization device and placing the vehicle in an operative state when said calculation signal is generated.

12. The apparatus according to claim 11, wherein a first of said at least two spacer sensor regions is connected to a start-up device of the driving motor and a second of said at least two spacing sensor regions is connected to a shut-off device of the driving motor.

13. The apparatus according to claim 11, wherein said at least two spacing sensor regions are disposed on opposite sides of said biometric sensor region.

14. The apparatus according to claim 11, wherein said two spacing sensor regions are disposed adjacent said biometric sensor region at a bottom of a channel.

* * * * *